United States Patent [19]

Ogawa et al.

[11] Patent Number: 4,725,864
[45] Date of Patent: Feb. 16, 1988

[54] VARI-FOCAL CAMERA

[75] Inventors: Yukio Ogawa, Kanagawa; Michio Hirohata; Takanori Kodaira, both of Tokyo, all of Japan

[73] Assignee: Canon Kabushiki Kaisha, Tokyo, Japan

[21] Appl. No.: 788,064

[22] Filed: Oct. 16, 1985

Related U.S. Application Data

[63] Continuation of Ser. No. 513,163, Jul. 13, 1983, abandoned.

[51] Int. Cl.[4] .................................................. G03B 3/00
[52] U.S. Cl. .............................. 354/195.12; 350/422
[58] Field of Search ................ 354/195.1, 195.12, 226, 354/230, 232, 233; 355/55, 58; 350/422, 437, 247

[56] References Cited

U.S. PATENT DOCUMENTS

| | | | |
|---|---|---|---|
| 4,200,377 | 4/1980 | Holderbaum | 354/195.1 |
| 4,214,829 | 7/1980 | Ohashi | 354/195.12 |
| 4,397,544 | 8/1983 | Yajima et al. | 355/58 |

FOREIGN PATENT DOCUMENTS

| | | | |
|---|---|---|---|
| 0089731 | 7/1981 | Japan | 354/233 |
| 0067504 | 4/1984 | Japan | 354/195.1 |

*Primary Examiner*—A. A. Mathews
*Attorney, Agent, or Firm*—Toren, McGeady & Associates

[57] ABSTRACT

In a vari-focal camera which has a photo-taking optical system including a main lens system and an auxiliary lens system and is arranged to be shiftable between at least two different focal lengths by moving the photo-taking optical system back and forth on a photo-taking optical axis in such a way as to cause the auxiliary lens system to move onto and out of the optical axis, a guide bar is arranged to allow a lens barrel unit which includes the photo-taking optical system, a shutter and a photo-taking lens focusing device to straightly move. The guide bar is fittingly engaged with a member secured to a camera body. The camera is further provided with an adjusting member for focusing the photo-taking optical system in each of preset positions in which the photo-taking lens has the different focal lengths.

37 Claims, 10 Drawing Figures

VARI-FOCAL CAMERA

This is a continuation application of Ser. No. 513,163, filed July 13, 1983 abandoned.

BACKGROUND OF THE INVENTION

1. Field of the Invention

This invention relates to a vari-focal camera which has a main lens system and an auxiliary lens system included in the photo-taking lens system thereof and is arranged to be shiftable between at least two different focal lengths by allowing the auxiliary lens system to move onto and out of a photo-taking optical axis in response to the movement of the photo-taking optical system.

2. Description of the Prior Art

With the exception of single-lens reflex cameras, photographic cameras, particularly 35 mm cameras with lens shutters, generally use taking lenses of focal lengths 35-40 mm. It is, however, more apposite to use a lens of a focal length suited to the condition of an object to be photographed. In view of this, there have been proposed various cameras of the type wherein an auxilairy lens system is incorporated in the camera in addition to a main lens system. The auxiliary lens system is arranged to move onto and out of a photo-taking optical axis according as the main lens system is moved in such a way as to permit photographing with a composite optical system consisting of the main and auxiliary lens systems as well as the ordinary photography to be performed solely with the main lens system. The cameras of this type include those disclosed in Japanese Laid-Open Patent Application Nos. Sho 52-76919 and Sho 54-33027.

An example of the prior art cameras of the above-stated type permitting not only standard photography but also tele-photography is arranged as shown in FIG. 1 of the accompanying drawings. Referring to FIG. 1, a main lens system L1 has a lens shutter S. The camera is provided further with an auxiliary lens system L2. A reference symbol F denotes a film surface. FIG. 1(a) shows a standard photographing state and FIG. 1(b) a tele-photographing state. In the tele-photographing state, the main lens system L1 and the lens shutter S shift toward the front of the camera while the auxiliary lens system is positioned in rear of the lens shutter S.

As shown, the main lens system and the lens shutter must be moved to the front of the camera while the auxiliary lens system must be in rear of the lens shutter in order to shift the optical system from one focal length to another. This requires highly complex operating mechanism. Besides, light shielding for the camera obscura becomes difficult. Further, the auxiliary lens system must be retracted from the photo-taking optical axis at the time of the standard photography. The retraction requires a stowing space for the auxiliary lens system within the camera body. The size of the camera thus inevitably increases to hinder reduction in size of the camera.

Further, bellows have heretofore been used as light shielding member for the camera obscura part. Generally, however, the bellows are made of a leather or cloth material. The material can be hardly made to be thin and thus requires a large space for having it incorporated in the camera. The light shielding member not only is thus unsuited for reduction in size but also has insufficient durability for preventing a leak of light through a hole which tends to result from repeated use.

Another problem with the vari-focal camera having such a photo-taking optical system resides in so-called infinity focusing required at the different focal lengths of the photo-taking optical system. More specifically, in the event that infinity focusing has been made with the camera set in the state for the standard photography to be performed solely with the main lens system, infinity focusing must be done again when the main lens system is moved to have the auxiliary lens system used in combination with the main lens system. Whereas, in the vari-focal cameras of the prior art that have been proposed in the past have paid no attention to the necessity of this infinity focusing and provided no adjusting means therefore.

SUMMARY OF THE INVENTION

It is a first object of the present invention to provide a simplified mechanism for a camera which eliminates the shortcomings of the prior art mentioned in the foregoing by including a straight moving bar in a mechanism arranged to move back and forth at the time of switch-over of a photo-taking optical system from one focal length to another.

It is a second object of the invention to provide a compact vari-focal camera which not only attains the above-stated first object but also permits effective utilization of a space available in relation to a light shielding member disposed within the camera.

It is a third object of the invention to provide an infinity focusing mechanism which is capable of enhancing the imaging performance of a vari-focal camera permitting switch-over of a photo-taking lens system from one focal length to another thereof.

These and further objects and features of the invention will become apparent from the following detailed description of a preferred embodiment thereof taken in conjunction with the accompanying drawings.

BRIEF DESCRIPTION OF THE DRAWINGS

FIG. 2 schematically shows in sectional views the essential parts of a vari-focal camera as an embodiment of the present invention.

DESCRIPTION OF THE PREFERRED EMBODIMENT

Figure 1A:
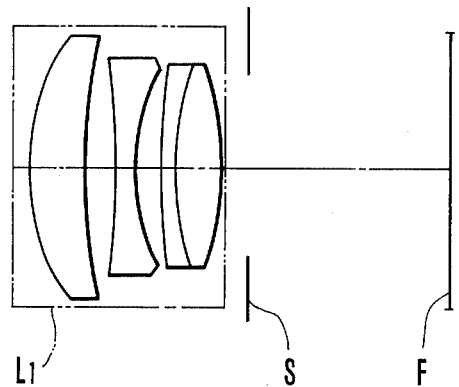
FIG. 1 is an illustration showing an example of the optical system employed in a vari-focal camera, FIG. 1(a) showing it as in a standard photographing state and FIG. 1(b) showing it as in a tele-photographing state.
Figure 1B:
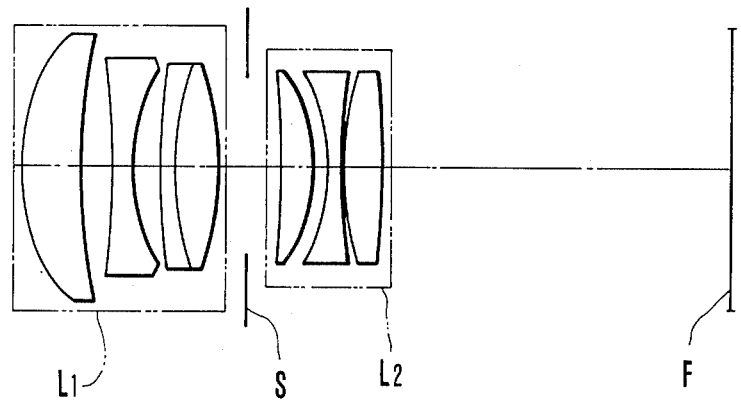
Figure 2A:
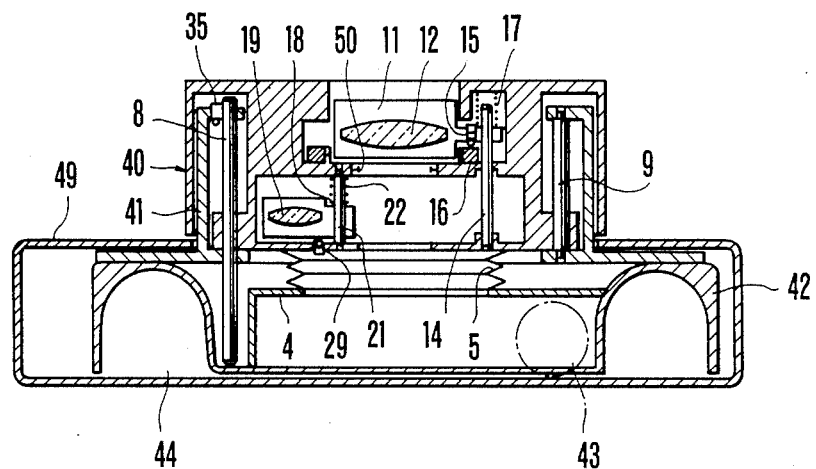
FIG. 2(a) shows the embodiment as in a standard photographing state and FIG. 2(b) shows it as in a tele-photographing state.
Figure 2B:
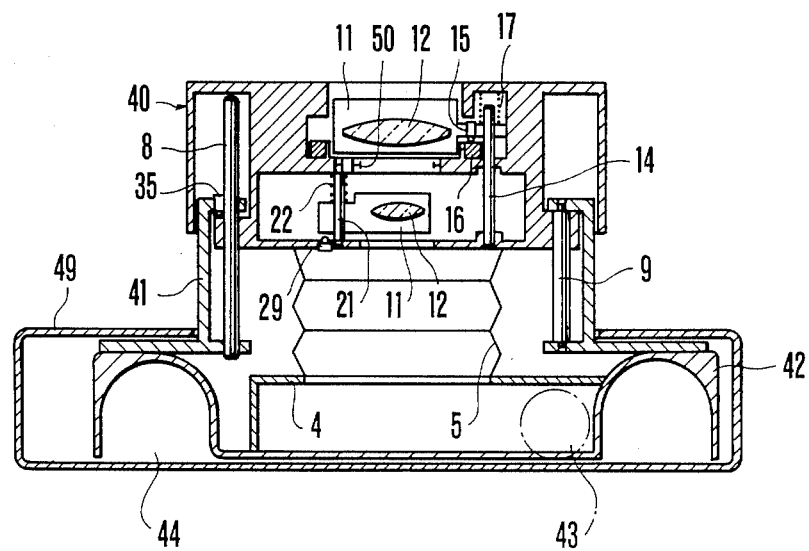

Referring to FIGS. 2(a) and 2(b) which schematically show in sectional views the essential parts of a vari-focal camera as an embodiment example of the invention, FIG. 2(a) shows the camera as in a standard photographing state while FIG. 2(b) shows it as in a tele-photographing state. The layout of the mechanisms of the camera is as shown in a front view in FIG. 3.

A main lens system 12 is carried by a lens barrel 11. A lens barrel bar 14 is secured to the lens barrel 11 and is arranged in parallel to a photo-taking optical axis. The lens barrel bar 14 is fittingly carried at two parts of a lens barrel unit 40. Further, an infinity adjustment screw 15 is screwed to the lens barrel 11 and is urged backward by a spring 17 wound round the above-stated lens barrel bar 14. The fore end of the infinity adjustment screw 15 abuts on a cam face of a rotating ring 16 which is in fitting engagement with the lens barrel unit 40 and is rotatably round the photo-taking axis. The lens barrel 11 is moved forward in a controlled manner for focusing when the rotating ring 16 is rotated by some means which is not shown.

Behind the lens barrel 11 is disposed a shutter part 50 which is arranged within the lens barrel unit 40. Further behind the shutter part 50 is an extender 18 which is arranged within a space behind the shutter part to carry an auxiliary lens system 19. The extender 18 is rotatable on an extender shaft 21 which is fittingly carried at two parts of the lens barrel unit 40. The extender 18 is urged by a spring 22 wound round the shaft 21 between the extender 18 and the lens barrel unit 40 to turn toward the photo-taking optical axis and also to move backward. Meanwhile, an adjustment screw 29 which is screwed to the rear face of the lens barrel unit 40 has the extender 18 abutting thereon.

A support bar 8 is secured to the lens barrel unit 40 and is arranged in parallel with the photo-taking optical axis. A support plate 41 which is mounted on the front of a camera body 42 and is fitted into the lens barrel unit 40 has the support bar 8 fittingly carried by the front and rear plate parts thereof in a slidable manner. An adjustment screw 35 is screwed to the front plate part of the support plate 41. Meanwhile, a guide bar 9 which is secured to the front and rear plate parts of the support plate 41 and is in parallel with the photo-taking optical axis is in fitting engagement with the opposite side of the lens barrel unit 40. The lens unit 40 is thus arranged to be guided by the guide bar 9 and to be slidable back and forth relative to the camera. In the standard photographing state shown in FIG. 2(a), the auxiliary lens system 19 is retracted from a photo-taking optical path. However, in the tele-photographing state as shown in FIG. 2(b), the auxiliary lens system is positioned on the photo-taking optical axis with the extender 18 rotated by moving the lens barrel unit 40 toward the front side of the camera.

Between the rear end of the lens barrel unit 40 and a light shielding frame plate 4 on the side of the camera body 42, there is arranged a bellows 5 to form a portion of a camera obscura part to shut out light.

The camera further includes a sprocket 43, a film cartridge chamber 44, a battery chamber 46, a mechanism 47 for charging the main lens system and a view finder 48.

Figure 4:
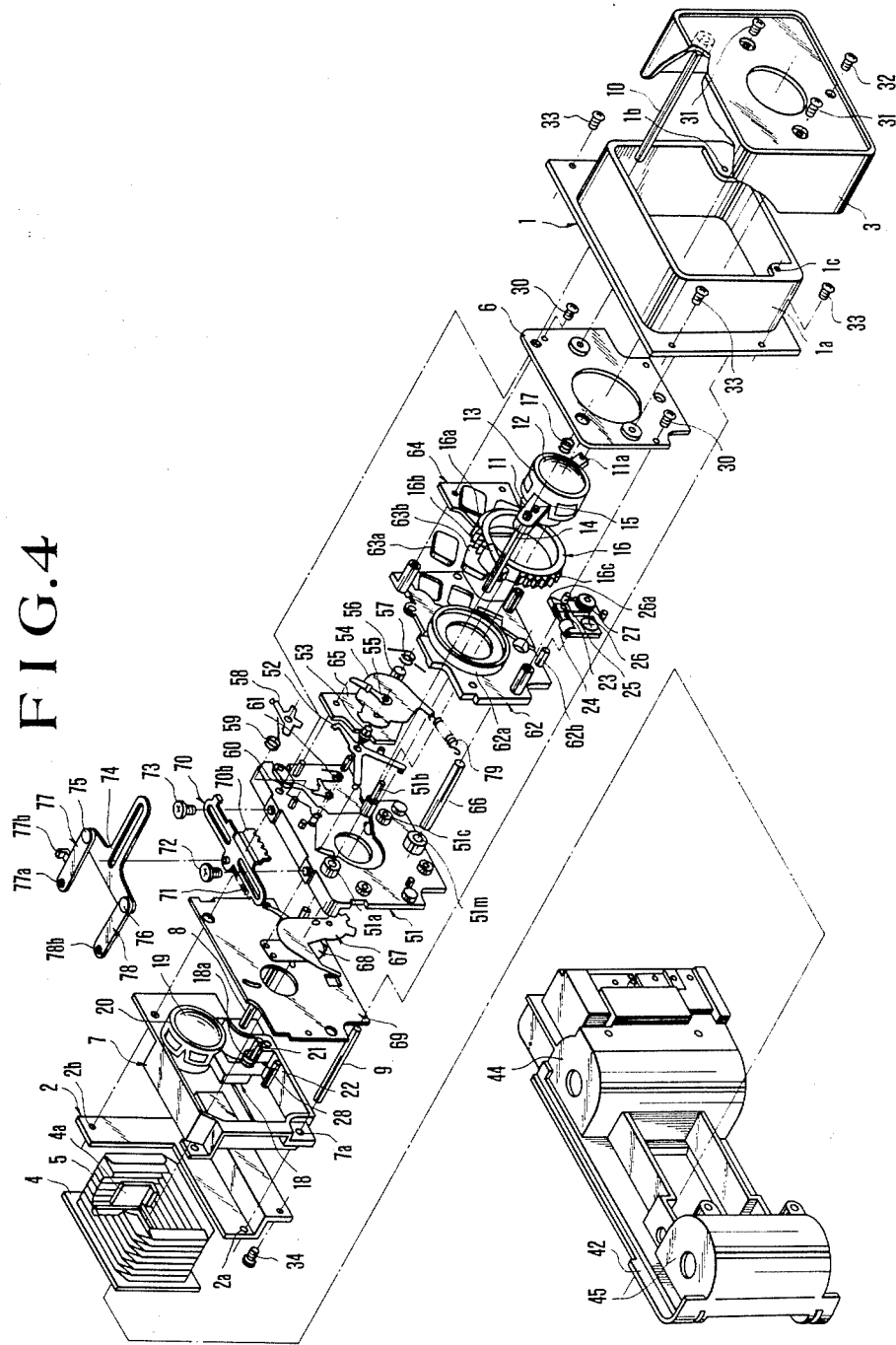
FIG. 4 is an exploded oblique view specifically showing the essential parts of FIG. 2.
Figure 5:
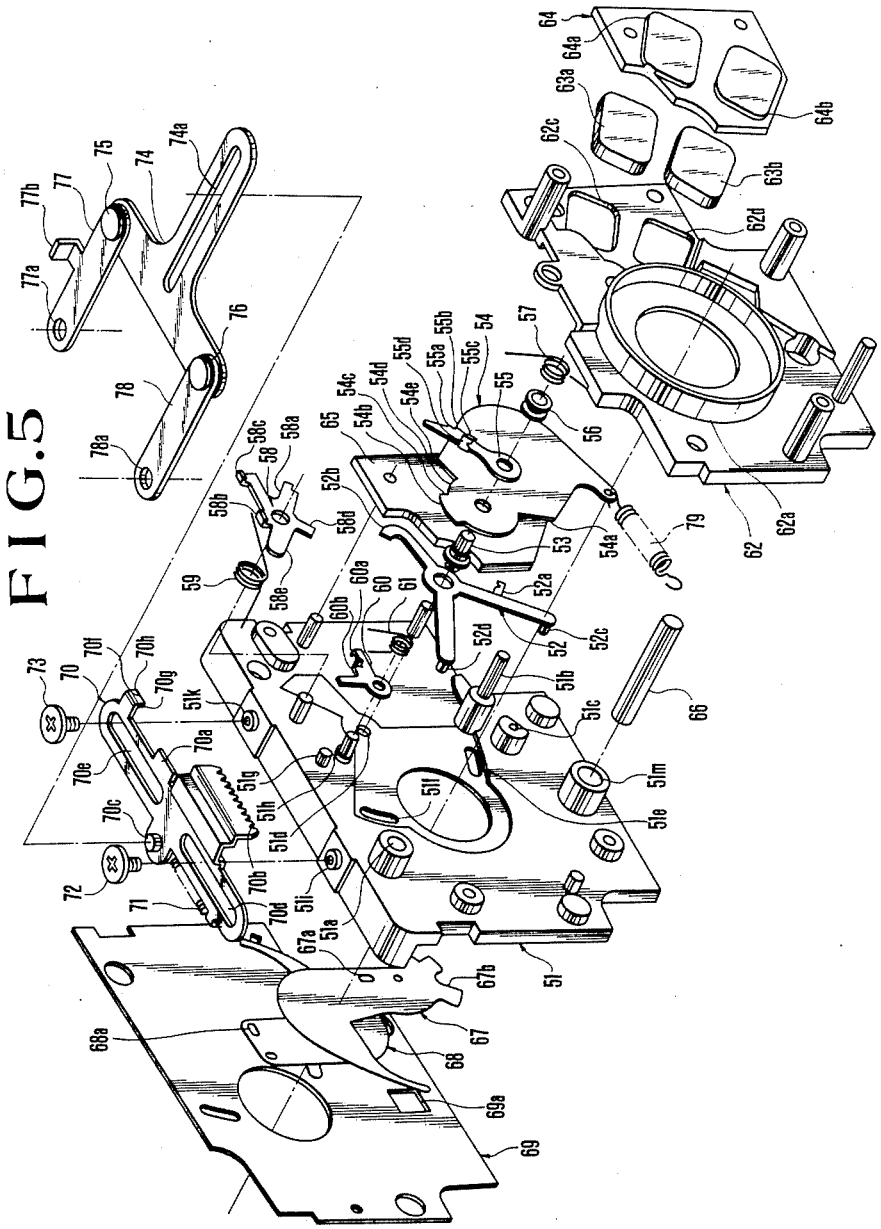
FIG. 5 is an enlarged, exploded oblique view showing a shutter unit employed in the camera.
Figure 6:
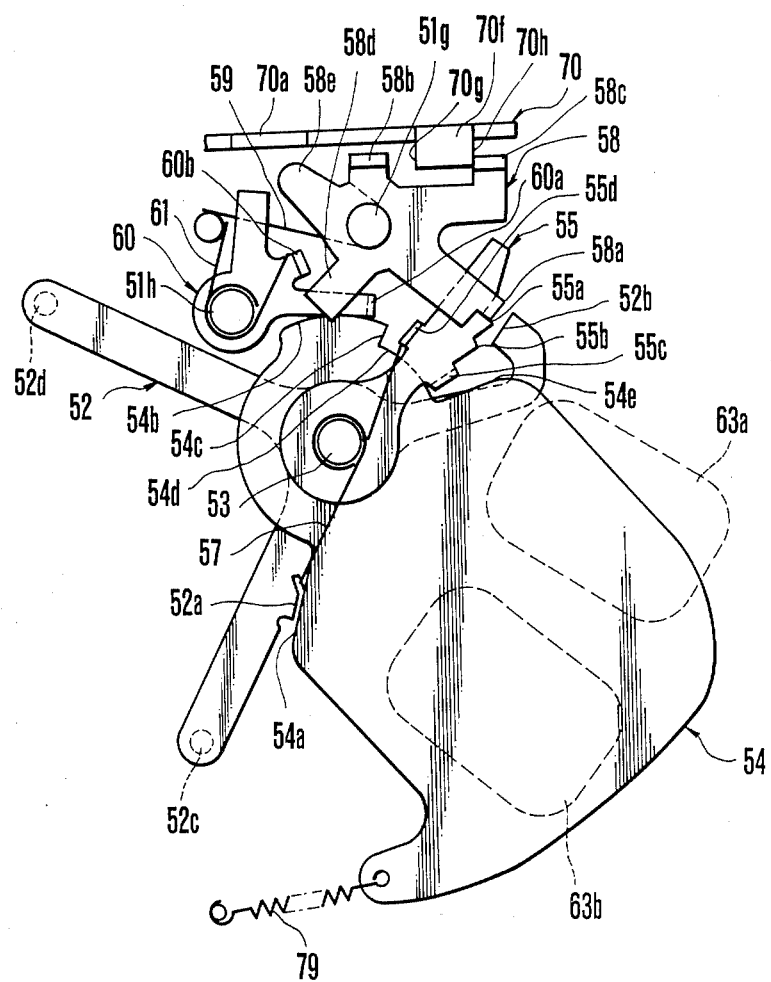
FIG. 6 is an enlarged front view showing the essential parts of the shutter mechanism shown in FIG. 5.
Figure 7:
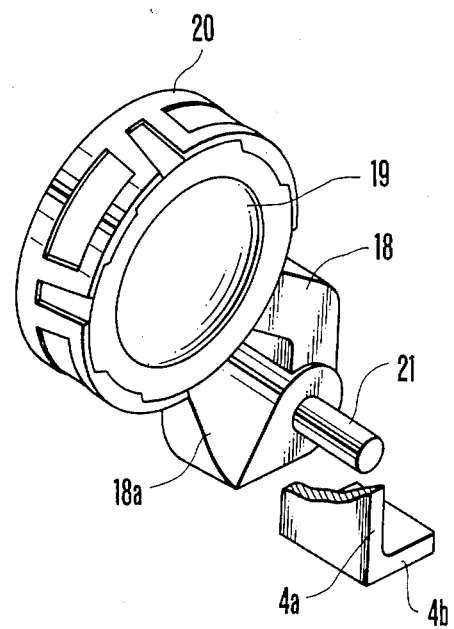
FIG. 7 is an enlarged oblique view showing the essential parts of an auxiliary lens system shown in FIG. 4 as viewed from the rear thereof.
Figure 8:
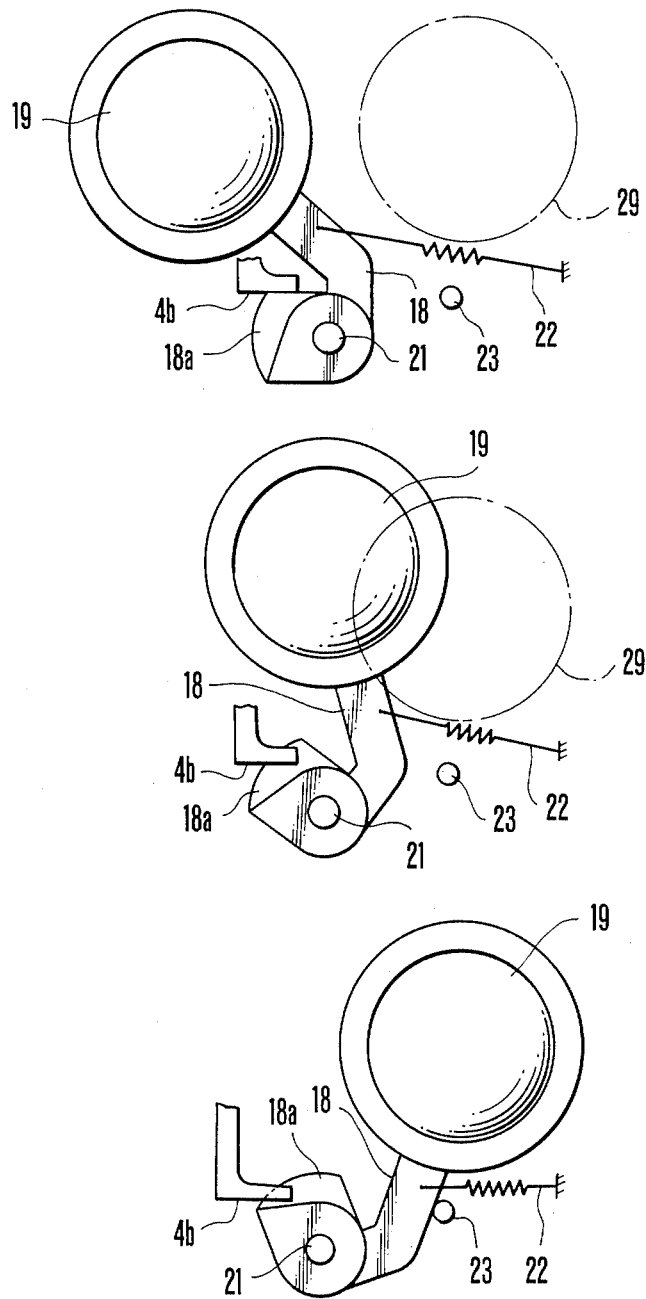
FIG. 8 is an illustration showing the rotating conditions of the auxiliary lens system.

The essential parts of the vari-focal camera shown in FIG. 2 are arranged as shown in further detail in FIGS. 4–7. Of these drawings, FIG. 4 is an exploded oblique view of the camera; FIG. 5 is an enlarged, exploded oblique view of the shutter unit of the camera; FIG. 6 is an enlarged front view showing the essential parts of the shutter operating mechanism of the shutter unit; and FIG. 7 is an enlarged oblique view showing the essential parts of the auxiliary lens system as viewed from the rear thereof. FIG. 8 is an illustration of the rotating conditions of the auxiliary lens system.

Referring first to FIG. 4, the parts constituting the main lens system are arranged as follows: The main lens system 12 is attached to the lens barrel 11 via a retaining ring 13. The lens barrel bar 14 is secured to the lens barrel and extends through the hole 51a of a shutter base plate 51 in parallel with the photo-taking optical axis. A U-shaped groove 11a is formed on the lens barrel 11 in a position opposite to that of the lens barrel bar 14. A dimple 51b which protrudes from the front of the shutter base plate 51 is arranged to fittingly engage with the U-shaped groove 11a. An infinity adjustment screw 15 which is provided for infinity focusing adjustment of the photo-taking optical system is screwed to the lens barrel 11. The fore end of the adjustment screw 15 is caused to abut on a forward moving cam 16b of a rotating ring 16 by a compression spring 17 wound round the lens barrel bar 14 between the lens barrel 11 and a front base plate 6. The inner circumferential face of the rotating ring 16 is rotatably fitted on the outer circumference of a cylindrical protrusion 62a which is formed concentrically with the middle opening of a magnet holder 62 mounted on the front side of the shutter base plate 51. Meanwhile, the outer circumference of the rotating ring 16 is provided with a gear part 16a and a plurality of teeth 16c. These teeth 16c are arranged to engage a stop claw 26a formed at the tip of a stop lever 26 while the gear part 16a is arranged to engage a rack part 70b of a set plate 70 arranged to slide on the upper edge of the shutter base plate 51. The stop lever 26 is rotatably fitted on the stop lever shaft 62b of the above-stated magnet holder 62. An armature 25 is attached to the stop lever 26. Under the charge completed condition of a main lens driving system, the armature 25 is attracted by a yoke 23 which is secured to the magnet holder 62. When a coil 24 which is encircling the yoke 23 is energized, the stop lever 26 is released from the attraction and is caused to turn clockwise by the urging force of a spring 27. The stop claw 26a of the stop lever 26 plunges into engagement with one of the teeth 16c of the rotating ring 16 to bring the rotation of the rotating ring 16 to a stop.

A cover 3 is fitted on the periphery of a square tubular part 1a of a front holding frame plate 1 which is one of the components of a holding part 41. Screws 31 fix the cover 3 to a front base plate 6 which is fixed in place by the magnet holder 62 and screws 30. An auxiliary bar 10 which has one end thereof secured to the cover 3 extends backward in parallel with the photo-taking optical axis piercing the front base plate 6, a shutter base plate 51 and a rear base plate 7 which is disposed in rear of the shutter base plate 51. The other end of the auxiliary bar 10 is fitted into a hole 2b provided in a rear holding frame plate 2 which is another component of the holding part 41. A light receiving lens 32 which is provided for a light measuring purpose is disposed in front of the cover 3. An incident light flux coming from an object to be photographed is arranged to be guided to a light measuring light sensitive element (not shown) by means of a light guide 66 which is carried by a hole part 51m of the shutter base plate 51.

The auxiliary lens system is arranged as follows: The auxiliary lens system 19 is carried by an extender 18 via a retaining ring 20. An extender shaft 21 which is fixedly attached to the extender 18 is rotatably fitted in a hole (not shown) provided in the rear base plate 7 and an extender shaft hole 51c provided in the shutter base plate 51. Meanwhile, a spring 22 pushes the extender shaft 21 toward the rear base plate 7 and also urges it counterclockwise, i.e. toward the photo-taking optical axis. The extender 18 is provided with a cam face 18a which is formed at the base part thereof on the side of the shaft 21 into a shape slanting down from the front to the rear thereof. The rear base plate 7 is mounted on the rear side of the shutter base plate 51. A supporting bar 8 which is secured to one lower side of the rear base plate 7 is fitted in and carried by a support bar hole 1b provided in the front holding frame plate 1 and a hole which is not shown but is provided in the rear holding frame plate 2. The other lower side of the rear base plate 7 is provided with a guide hole 7a. A guide bar 9 which has the two ends thereof secured to a hole 1c of the front holding frame plate 1 and a hole 2a of the rear holding frame plate 2 is fitted in the guide hole 7a. With the guide bar 9 used as guide, the rear base plate 7 is thus arranged to be slidable between the front and rear holding frame plates 1 and 2 together with the support bar 8. The rear base plate 7 has a stopper pin 28 erected thereof. When the extender 18 is turned toward the photo-taking optical axis, the stopper pin 28 serves to position the extender 18. Under the condition as shown in FIG. 4, the auxiliary lens system 19 is in a position in which it has been retracted from the photo-taking optical path, that is, the lens system is in the state as shown in FIG. 2(a).

The above-stated rear holding frame plate 2 has its position defined by the front holding frame plate 1 and is fixed by screw 34. The front holding frame plate 1 is mounted on the camera body 42 and is attached to the fronts of the film cartridge chamber 44 and the spool chamber 45 with screws 33. The front portion of the front holding frame plate 1 is formed into the square tubular part 1a which represents a part of the appearance of the camera.

Figure 3:
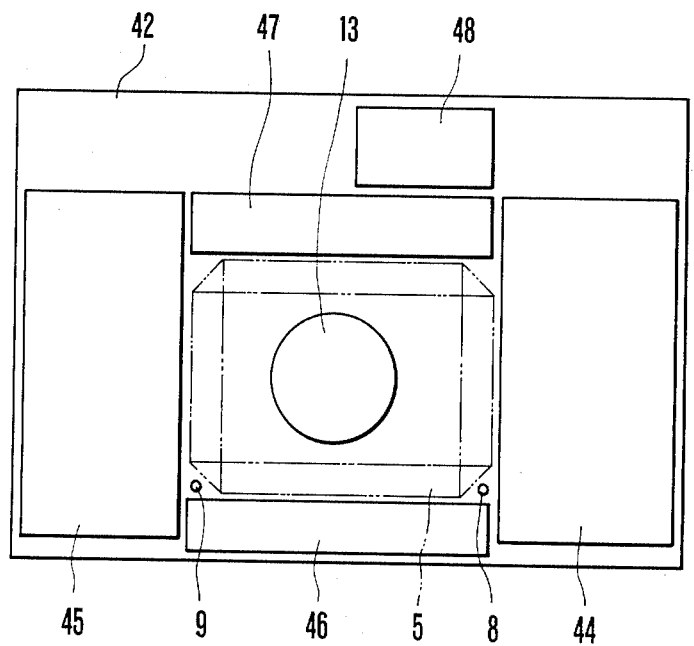
FIG. 3 is a front view showing the layout of the mechanisms of the camera shown in FIG. 2.

Further, a light shielding frame plate 4 is fixedly interposed in between the film cartridge chamber 44 and the spool chamber 45 of the camera body 42. A bellows 5 is arranged within the rear holding frame plate 2 with end faces of the bellows 5 secured respectively to the light shielding frame plate 4 and the rear base plate 7. As shown in FIGS. 3 and 4, the bellows 5 is formed into a rectangular shape with four corners chamfered. The chamfered corners of the bellows are arranged to leave spaces for the above-stated support bar 8, and the guide bar 9 when the bellows 5 is positioned within the camera. Therefore, the bellows 5 never comes to interfere with these bars. The light shielding frame plate 4 is provided with an L shaped protrusion 4a which has a lower face 4b formed along the inside of the bellows 5. The lower face 4b abuts on the cam face 18a of the above-stated extender 18 to serve as follower thereof.

The bellows 5 is preferably made of a material, such as polyfluoro-vinyl resin, resol type phenol resin, a copolycondensate of xylen resin and phenol resin, epoxy resin, unsaturated polyester resin, silicone resin, etc. which is cured with a curing agent or a curing catalyst, under heating, if necessary. Use of an unsaturated polyester resin material measuring 35μ or thereabout in thickness is especially advantageous for the bellows. Generally, it is hardly possible to completely shut out light with the use of such a thermosetting resin alone. Therefore, a light shielding property is imparted to the material by mixing a carbon black, such as furnace black or channel black therein. In a cases where the surface of the bellows has a luster which tends to cause a ghost or the like, The material is delustered by a so-called frosting process which imparts minute unevenness onto the surface thereof.

The shutter unit shown in FIGS. 4–6 is arranged as follows: A selector lever 52 is fitted on a selector lever shaft 53 which is inserted into a hole 51d provided in the shutter base plate 51. A rotor 54 is provided with a coil which is formed into a printed pattern. The rotor 54 is fittingly engaged with the selector lever shaft 53 and is urged clockwise by a rotor spring 79. The selector lever shaft 53 further has a release lever 55 also fittingly engaged therewith. The release lever 55 is provided with a spring peg part 55d while the selector lever 52 is provided with a claw part 52a. Between the spring peg part 55d of the release lever 55 and the claw part 52a of the selector lever 52, there is arranged an opening spring 57 which is wound round retainer 56 attached to the end of the shaft 53. The release lever 55 is urged clockwise and the selector lever 52 counterclockwise respectively by the spring 57. A bent part 55c of the release lever 55 is arranged to be capable of abutting on the edge 54e of the rotor 54. The selector lever 52 is further provided with pins 52c and 52d. These pins 52c and 52d extend through slots 51e and 51f of the shutter base plate 51 to fittingly engage slots 67a and 68a provided in shutter blades 67 and 68 which are pivotally carried by shafts which are not shown but are disposed on the rear side of the shutter base plate 51. The above-stated claw part 52a of the selector lever 52 is arranged to be capable of abutting on the edge 54a of the rotor 54. A lock lever 58 fittingly engages with a dimple 51g provided on the front side of the shutter base plate 51 and is urged clockwise by a lock spring 59. A claw part 58a of the lock lever 58 is engageable with the first and second claw parts 55a and 55b of the release lever 55. The claw part 58a is further arranged to be capable of abutting on the claw part 52b of the selector lever 52. There is provided a rotor holding lever 60 which fittingly engages with a dimple 51h disposed on the front side of the shutter base plate 51 and is urged clockwise by a spring 61. A claw part 60a of the rotor holding lever 60 is arranged to be engageable with an engaging part 54c which is formed jointly by the edge 54b and a recess 54d of the rotor 54. Another claw part 60b is capable of abutting on a claw part 58d of the lock lever 58.

The set plate 70 which has been mentioned in the foregoing is provided with a pair of slots 70d and 70e which fittingly engage with dimples 51i and 51k provided on the upper edge of the shutter base plate 51 and are respectively retained in place by means of screws 72 and 73. The set plate 70 is thus arranged to be slidable in right and left directions perpendicular to the photo-taking optical axis. Further, the plate 70 is urged rightward by a charge spring 71. The rack part 70b of the plate 70 engages the gear part 16a of the above-stated rotating ring 16 to have the sliding movement of the plate 70 converted into a rotating movement of the ring 16. A claw part 70a of the set plate 70 is engageable with a claw part 58e of the lock lever 58. Another claw part 70f of the plate 70 has its left and right sides 70g and 70h arranged to be capable of abutting on the claw parts 58b and 58c of the lock lever 58. A dimple 70c which protrudes from the upper face of the plate 70 engages a slot 74a provided in a charge lever 74.

The charge lever 74 is rotatably connected to one end of each of arms 77 and 78 by means of connection pins 75 and 76. The arms 77 and 78 are provided with holes 77a and 78a at their other ends and are pivotally carried through these holes by shafts of the camera body 42 which are not shown. A parallelogramic link mechanism is formed by these parts. The link mechanism is arranged such that the longitudinal direction of the slot 74a of the charge lever 74 is kept perpendicular to the sliding direction of the set plate 70. The plate 77 is provided with a claw part 77b which is arranged to be pushed at the time of a charging action by an interlocking member which is not shown.

The magnet holder 62 is disposed in front of the shutter base plate 51 and is interconnected with the shutter base plate 51 leaving an internal space between them. Holes 62c and 62d are provided on one side of the tubular protrusion 62b of the magnet holder 62. Magnets 63a and 63b are positioned and fittingly attached to the holes 62c and 62d. A front yoke 64 which is secured to the magnet holder 62 is provided with recesses 64a and 64b. The recesses 64a and 64b are formed by half-punching and are arranged to have the magnets 63a and 63b attached thereto with pressure. The magnet holder 62 and a rear yoke 65 are spaced a predetermined distance with the rotor 54 interposed in between them. Both the magnets 63a and 63b are magnetized in the directions of their thickness and their magnetized directions are opposite to each other. A magnetic circuit is formed by the magnets 63a and 63b, the front yoke 64 and the rear yoke 65. When power supply is effected to the rotor 54, the rotor is driven to rotate counterclockwise.

On the rear side of the shutter base plate 51 is mounted a blade retainer 69 which is arranged to retain the shutter blades 67 and 68 in place. The hole part 51m of the shutter base plate 51 which is arranged to carry the light guide 66 as has been mentioned in the foregoing is opposed to a hole part 69a of the blade retainer 69. A light receiving or light sensitive element and a shutter control circuit which are not shown are arranged behind the hole part 69a of the shutter blade retainer 69. The quantity of light incident upon this light sensitive element is controlled by a cut-out part 67b of the shutter 67.

The main lens system arrangement, the auxiliary lens system arrangement and the shutter unit described above form a lens barrel unit 40.

The vari-focal camera which is arranged as described above in accordance with the invention operates in the following manner:

First, the shutter unit operates as follows: In feeding the film within the camera, the charge lever 74 moves to the left when the claw part 77b of the arm 77 is moved to the left by the interlocking means which is not shown. Accordingly, the set plate 70 slides to the left to an extent which is unvarying irrespectively of the position of the dimple 70c of the set plate 70 within the slot 74a of the charge lever 74. At the same time, the rotating ring 16 rotates counterclockwise to effect charging. In that instance, the left side face 70g of the claw part 70f of the plate 70 abuts on the claw part 58b of the lock lever 58. The lock lever 58 turns counterclockwise. The claw part 58a of the lock lever 58 comes to engage with the claw part 55a of the release lever 55. After than, when the force exerted on the claw part 77b of the arm 77 is removed, the set plate 70 is moved back to the right by the urging force of the spring 71. However, the right side face 70h of the claw part 70f is then pushed against the claw part 58c of the lock lever 58 and is locked in that position as shown in FIG. 6.

Such being the arrangement, the charging actions of these parts are allowed to take place only by the position of the claw part 77b of the arm 77 even when the lens barrel unit 40 including the shutter unit 50 and the automatic focusing mechanism moves back and forth. Further, the charging actions are never affected by the movement of the lens barrel unit during the charging process.

Meanwhile, when the lock lever 58 turns counterclockwise, the rotor holding lever 60 which has been hindered from turning until that time with its claw part 60b abutting on the claw part 58d of the lock lever 58 comes to turn clockwise. Then, the claw part 60a of the rotor holding lever 60 is pressed against the edge 54b of the rotor 54 and is kept in that position. The charged state after film feeding is as shown in FIG. 6.

Under this condition, when power supply is effected to the rotor 54 for the first time through an electric circuit (not shown) by a shutter release operation, the rotor 54 turns counterclockwise and abuts on the claw part 55c of the release lever 55. This causes the release lever 55 to turn also counterclockwise. As a result of that, the claw part 58a of the lock lever 58 is disengaged from the first claw part 55a of the release leve 55. Accordingly, the lock lever 58 is caused by the lock spring 59 to turn clockwise. The claw part 58c of the lock lever 58 then disengages from the claw part 70f of the set plate 70 to allow the set plate 70 to be slid to the right by the urging force of the spring 71. Since the plate 70 is interlocked with the rotating ring 16 of the automatic focusing mechanism, the set plate 70 is then slowly slid by virtue of the action of a governor which is not shown. Therefore, the lock lever 58 is temporarily kept in a position where the claw part 58e thereof abuts on the claw part 70a of the set plate 70. When the power supply to the rotor 54 is cut off during this period of keeping the lever 58 in that temporary position, the rotor 54 is returned by the urging force of the rotor spring 79 and the release lever 55 by the urging force of the opening spring 57. As a result of this, the claw part 58a of the lock lever 58 engages the second claw part 55b of the release lever 55. Then, the rotor holding lever 60 which has been brought into pressed contact with the edge 54b of the rotor 54 when the rotor 54 is turned counterclockwise by the first power supply comes to have its claw part 60a plunge into the recess 54d of the rotor 54. Therefore, when the power supply to the rotor 54 is cut off as mentioned above, the rotor 54 moves back to a position where its engaging part 54c engages with the claw part 60a of the rotor holding lever 60 and the rotor 54 is temporarily kept in that position. This position of the rotor 54 is slightly away in the clockwise returning direction from another position in which the edge 54e thereof abuts on the claw part 55c of the release lever 55. Further, with the rotor 54 rotating counterclockwise as mentioned above, the edge 54a of the rotor 54 which has been in pressed contact with the claw part 52a of the selector lever 52 detaches from the claw part 52a. However, another claw part 52b of the selector lever 52 then comes into pressed contact with the claw part 58a of the lock lever 58 to prevent the selector lever 52 from turning. Therefore, the camera performs no exposure.

When power supply to the rotor 54 is effected for the second time, the rotor 54 turns counterclockwise from the position in which it has been kept by the claw part 60a of the rotor holding lever 60. The edge 54e of the rotor 54 then immediately comes to abut on the claw part 55c of the release lever 55. This causes the release lever 55 to turn also counterclockwise. The second claw part 55b of the release lever 55 then disengages from the claw part 58a of the lock lever 58. As a result of that, the lock lever 58 is caused to turn clockwise by the urging force of the lock spring 59. The claw part 58a of the lock lever 58 is then released from the claw part 52b of the selector lever 52. The opening spring 57 then causes the selector lever 52 to turn counterclockwise. The shutter blades 67 and 68 are then opened through the pins 52c and 52d of the selector lever 52. Further, with the lock lever 58 turning clockwise, the claw part 58d thereof comes to abut on the claw part 60b of the rotor holding lever 60 to cause the rotor holding lever 60 to turn counterclockwise. As a result of that, the claw part 60a of the rotor holding lever 60 is retracted from the rotating range of the rotor 54.

A light flux from the object to be photographed enters the light sensitive element (not shown) through the light guide 66. The quantity of the light incident upon the light sensitive element is controlled by the cut-out part 67b of the shutter blade 67. When the light quantity reaches a predetermined value, a shutter control circuit acts to cut off the power supply to the rotor 54. With the power supply thus cut off, the rotor 54 is caused by the urging force of the rotor spring 79 to begin to return in the clockwise direction. Then, the edge 54a of the rotor 54 comes to abut in an impinging manner on the claw part 52a of the selector lever 52 which is having the shutter blades 67 and 68 in a half-opened or completely opened state. This causes the selector lever 52 to turn clockwise together with the rotor 54. As a result of that, the shutter blades 67 and 68 which are interlocked with the selector lever 52 are closed to terminate an exposure.

Next, the operation for shifting the photo-taking optical system from the standard photographing state to the tele-photographing state and the photographing operation of the camera including the automatic focusing action thereof are as follows:

When the photographer moves the cover 3 back and forth relative to the camera, the lens barrel unit 40 slides back and forth accordingly with the guide bar 9 serving as guide in conjunction with the support bar 8 which is fittingly engaged with and carried by the front and rear holding frame plates 1 and 2. In this instance, the lens barrel unit 40 is carried solely by the support bar 8 and is in a state of being supported in a cantilever like manner. However, the guide bar 9 and the auxiliary bar 10 which are secured to the cover 3 jointly provide reinforcement.

In order that the photo-taking optical system is shifted from the standard photographing state to the tele-photographing state, the auxiliary lens system 19 of the extender 18 must be moved and positioned on the photo-taking optical axis according as the lens barrel unit 40 is moved toward the front of the camera. FIG. 8(a) shows the standard photographing state using the main lens system 12 alone. Under this condition, the lower face 4b of the L-shaped protrusion 4a which is provided on the light shielding plate 4 abuts on the high cam lift portion of the cam face 18a of the extender 18. Meanwhile, the auxiliary lens system 19 stays outside of the aperture 29 which is located in the middle of the photo-taking optical system on the photo-taking optical axis. The cam face 18a of the extender 18 comes to escape from the lower face 4b of the L-shaped protrusion 4a according as the lens barrel unit 40 moves forward. However, since the extender 18 is urged to turn clockwise by the spring 22 as viewed from the rear of the camera, the cam face 18a turns clockwise while following the lower face 4b in contact therewith as shown in FIG. 8(b).

With the lens barrel unit 40 moved forward, the extender 18 ceases to turn at a point where it comes into contact with the stopper 28 of the rear base plate 7. Then, the auxiliary lens system 19 is set on the optical axis of the aperture 29. Meanwhile, the lens barrel unit 40 moves a little further forward until the cam face 18a of the extender 18 comes out of contact with the lower face 4b of the protrusion 4a. The photo-taking optical system is thus shifted to the tele-photographing state.

In case of switch-over from the tele-photographing state to the standard photographing state, the extender 18 is retracted from the optical axis of the aperture 29 through a process reverse to the process mentioned above.

In photographing, the charging action of the main lens driving system is first performed in the following manner: The leftward sliding movement of the set plate 70 which is responsive to the movement of the charge lever 74 causes the rotating ring 16 to rotate counterclockwise; and, when the set plate 70 is locked in a charging position, the rotating ring 16 is also held in that position as mentioned in the foregoing. During this process, the forward moving cam 16b of the rotating ring 16 brings the lens barrel 11 into a state of having been moved forward via the infinity adjustment screw 15 (on the side of a close-up distance). With the lens barrel 11 brought to a stop in that state, charging of the lens barrel 11 is completed. When a shutter release operation is performed under this condition, the first power supply is effected to the rotor 54 of the shutter unit 50 in the manner as has been described in the foregoing. The set plate 70 is unlocked. The plate 70 begins to move to the right. This causes the rotating ring 16 to rotate clockwise. The infinity adjustment screw 15 begins to move the lens barrel 11 inward following the movement of the forward moving cam 16b of the rotating ring 16. The charge lever 74 on the other hand moves rightward in response to the travel of the set plate 70 in parallel therewith. Then, the distance measuring part of the automatic focusing mechanism which is not shown but is arranged to be responsive to the movement of the charge lever 74 measures a distance to the object to be photographed. A distance measurement completion signal is produced.

The coil 24 is energized concurrently with the first power supply to the rotor 54. With the coil 24 energized, the armature 25 of the stop lever 26 is kept attracted by the yoke 23. However, when the distance measurement completion signal is produced, the power supply to the coil 24 is cut off and the attracting force between the armature 25 and the yoke 23 disappears. Therefore, the stop lever 26 is caused to turn clockwise by the urging force of the spring 27. The stop claw 26a disposed at the tip of the stop lever 26 plunges into contact with a given tooth among the plurality of teeth 16c of the rotating ring 16 to bring the ring 16 to a stop. As a result of that, the lens barrel 11 is kept in a predetermined adjusted position, i.e. in an in-focus position. After the lens barrel 11 is kept in the adjusted position, the shutter blades 67 and 68 are opened and closed to effect an exposure of the film surface when the second power supply is effected to the rotor 54 in the manner as has been described in the foregoing.

The following description relates to an inifinity focusing operation:

In the standard photographing state using solely the main lens system as shown in FIG. 2(a), the infinity focal point of the lens barrel 11 carrying the main lens system 2 is adjusted by adjusting the screw-in extent of the infinity adjustment screw 15. With the screw 15 adjusted, the lens barrel 11 is guided by the lens barrel bar 14 and moves to a very slight extent back and forth along the optical axis to permit focusing on an object located at an infinity distance.

When the standard photographing state of FIG. 2(a) is switched over to the tele-photographing state of FIG. 2(b), the lens barrel unit 40 moves together with the photo-taking optical system in the forward direction relative to the camera until it stops to abut on the adjustment screw 34. In response to this, the extender 18 is turned via cam means which is not shown to position the auxiliary lens system on the photo-taking optical axis. In this instance, the stopping position of the lens barrel unit 40 is adjustable by adjusting the screw-in extent of the adjustment screw 34. Therefore, focusing on an infinity distance object is accomplished with a distance between the film surface and the optical system which includes the main lens system 12 and the auxiliary lens system 19 thus adjusted.

In this manner, the embodiment ensures satisfactory focusing on an infinity distance object even when the photo-taking optical system is shifted either to the standard photographing state or to the tele-photographing state.

In the specific adjusting arrangement described above, the infinity focal point adjustment is accomplished with the main lens system 12 and the auxiliary lens system 19 handled as one unified body without varying their relative positions. However, the adjustment may be accomplished by adjusting the auxiliary lens system 19 alone. In that instance, the focusing on the infinity distance object can be accomplished by adjusting the screw-in extent of the adjustment screw 23 which is abutting on the extender 18. With the adjustment screw 23 thus adjusted, the position of the extender 18 which is carrying the auxiliary lens system 19 can be varied to a slight extent back and forth along the photo-taking optical axis.

Therefore, in accordance with the embodiment example given in FIG. 2, the adjustment can be satisfactorily accomplished by using either the adjustment screw 23 or the adjustment screw 34.

In the vari-focal camera according to the invention, the photo-taking optical system is arranged to be moved back and forth along the photo-taking optical axis with a straight moving bar serving as guide for the movement. This arrangement not only permits simplification of the structure of the camera but also permits effective utilization of a space in relation to the bellows disposed inside the camera, so that the camera can be manufactured in a compact shape.

Use of a thermosetting resin material or the like for the bellows permits reduction in thickness thereof for furtherance of the compactness.

In a vari-focal camera of the type having a photo-taking optical system shiftable from one focal length to another by moving a main lens system, the arrangement according to the invention permits infinity focus adjustment without difficulty at each of different focal lengths, so that the switch-over of the photo-taking optical system can be accomplished without the fear of out-of-focus photographing.

What we claim:

1. A vari-focal optical apparatus for a camera including:
   (A) a first optical system arranged to move along a photographic optical path;
   (B) a second optical system arranged to enter into, or exit from, the photographic optical path;
   (C) means for moving said first optical system along the photographic optical path and bringing or taking said second optical system into or out of the photographic optical path to change the focal length; and
   (D) first adjusting means for adjusting the standard focusing position when said second optical system is outside the photographic optical path; and
   (E) second adjusting means for adjusting the standard focusing position when said second optical system lies in the photographic optical path.

2. An apparatus according to claim 1, wherein said second adjusting means includes one-side adjusting means for adjusting only said second optical system.

3. An apparatus according to claim 1, wherein said second adjusting means includes both-side adjusting means for adjusting both said first and said second optical systems.

4. An apparatus according to claim 3, wherein said second adjusting means includes one-side adjusting means for adjusting only said second optical system.

5. An apparatus according to claim 1, further comprising a shutter which moves integrally with said first optical system along the photographic optical path.

6. An apparatus according to claim 1, wherein said first adjusting means and said second adjusting means are adjustable so as to prevent the movement stroke of the first optical system for changing the focal length from changing.

7. An apparatus according to claim 1, wherein the standard focusing position to be adjusted by said first adjusting means and said second adjusting means adjusts a focusing position for an infinity distance object.

8. An apparatus according to claim 1, further comprising elastic means for biasing the second optical system toward entrance into the photographic optical path.

9. An apparatus according to claim 8, further comprising cam means for causing the second optical system to exit from the photographic optical path against the elastic means.

10. An apparatus according to claim 1, wherein at least one of said first adjusting means and said second adjusting means is adjustable so as to prevent the movement stroke of the first optical system for changing the focal length from changing.

11. An apparatus according to claim 1, wherein the standard focusing position to be adjusted by at least one of said first adjusting means and said second adjusting means adjusts a focusing position for an infinity distance object.

12. A vari-focal optical apparatus for a camera, including:
   (A) a first optical system for forming a photographic optical path;

(B) a second optical system arranged upon entrance into or exit from said photographic optical path to change the focal length of said first optical system;

(C) first adjusting means for adjusting the standard focusing position when said second optical system is outside the photographic optical path; and (D) second adjusting means for adjusting the standard focusing position when said second optical system lies in the photographic optical path.

13. An apparatus according to claim 12, wherein said second adjusting means includes one-side adjusting means for adjusting only said second optical system.

14. An apparatus according to claim 12, wherein said second adjusting means includes both-side adjusting means for adjusting both said first and said second optical systems.

15. An apparatus according to claim 14, wherein said second adjusting means includes one-side adjusting means for adjusting only said second optical system.

16. An apparatus according to claim 12, wherein the standard focusing position to be adjusted by said first adjusting means and said second adjusting means adjusts a focusing position for an infinity distance object.

17. An apparatus according to claim 12, further comprising elastic means for biasing the second optical system toward entrance into the photographic optical path.

18. An apparatus according to claim 17, further comprising cam means for causing the second optical system to exit from the photographic optical path against the elastic means.

19. An apparatus according to claim 12, wherein the standard focusing position to be adjusted by at least one of said first adjusting means and said second adjusting means adjusts a focusing position for an infinity distance object.

20. A vari-focal optical apparatus for a camera, including:

(A) a first optical system for forming a photographic optical path;

(B) a second optical system arranged upon entrance into or exit from the photographic optical path to change the focal length of said first optical system between first and second values;

(C) first adjusting means for adjusting the standard focusing position with the focal length at the first value; and (D) second adjusting means for adjusting the standard focusing position with the focal length at the second value.

21. An apparatus according to claim 20, wherein said second adjusting means includes one-side adjusting means for adjusting only said second optical system.

22. An apparatus according to claim 20, wherein said second adjusting means includes both-side adjusting means for adjusting both said first and said second optical systems.

23. An apparatus according to claim 22, wherein said second adjusting means includes one-side adjusting means for adjusting only said second optical system.

24. An apparatus according to claim 20, wherein the standard focusing position to be adjusted by said first adjusting means and said second adjusting means adjusts a focusing position for an infinity distance object.

25. An apparatus according to claim 20, further comprising elastic means for biasing the second optical system toward entrance into the photographic optical path.

26. An apparatus according to claim 25, further comprising cam means for causing the second optical system to exit from the photographic optical path against the elastic means.

27. An apparatus according to claim 20, wherein the standard focusing position to be adjusted by at least one of said first adjusting means and said second adjusting means adjusts a focusing position for an infinity distance object.

28. A vari-focal camera comprising:

(A) a photo-taking optical system changeable between focal lengths, said photo-taking optical system including a first optical system movable back and forth along an optical axis and a second optical system for entering into and coming out of the optical axis;

(B) a focal length change over device which moves said first optical system back and forth along said optical axis and at the same time has said second optical system enter into and come out of said optical axis, for changing said photo-taking optical system between a first focal length condition and a second focal length condition;

(C) a first adjustment member for setting a reference focal point of said photo-taking optical system when said photo-taking optical system is in the first focal length condition; and (D) a second adjustment member for setting a reference focal point of said photo-taking optical system when said photo-taking optical system is in the second focal length condition.

29. A camera according to claim 28, wherein said second adjustment member includes a member for adjusting said second optical system back and forth along said optical axis.

30. A camera according to claim 28, wherein said first and second adjustment members include an adjustment screw.

31. A camera according to claim 28, further comprising a shutter which moves integrally with the first optical system along the optical axis.

32. A camera according to claim 28, wherein said first adjustment member and said second adjustment member are adjustable so as to prevent the movement stroke of the first optical system for changing the focal length from changing.

33. A camera according to claim 28, wherein said reference focal point which is adjusted by said first and second adjustment members corresponds to a focusing position for an infinity distance object.

34. A camera according to claim 28, further comprising elastic means for biasing the second optical system toward entrance into the optical axis.

35. A camera according to claim 34, further comprising cam means for causing the second optical system to exit from the optical axis against the elastic means.

36. A camera according to claim 28, wherein at least one of said first adjustment member and said second adjustment member is adjustable so as to prevent the movement stroke of the first optical system for changing the focal length from changing.

37. A camera according to claim 28, wherein said reference focal point which is adjusted by at least one of said first and said second adjustment member corresponds to a focusing position for an infinity distance object.

* * * * *

UNITED STATES PATENT AND TRADEMARK OFFICE
CERTIFICATE OF CORRECTION

PATENT NO. : 4,725,864
DATED : February 16, 1988
INVENTOR(S) : Yukio Ogawa et al It is certified that error appears in the above-identified patent and that said Letters Patent is hereby corrected as shown below:

In the heading of the Patent, it should read:

[30]     Foreign Application Priority Data

July 17, 1982 [JP]   Japan .......... 57-123785

July 21, 1982 [JP]   Japan .......... 57-125839

Signed and Sealed this

Twentieth Day of September, 1988

*Attest:*

DONALD J. QUIGG

*Attesting Officer*  *Commissioner of Patents and Trademarks*